United States Patent
Lee

(10) Patent No.: US 7,515,942 B2
(45) Date of Patent: Apr. 7, 2009

(54) METHOD AND DEVICE FOR TELEPHONE NUMBER SEARCH IN A MOBILE TERMINAL

(75) Inventor: Nam-Kyu Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 433 days.

(21) Appl. No.: 11/312,135

(22) Filed: Dec. 20, 2005

(65) Prior Publication Data

US 2006/0142050 A1 Jun. 29, 2006

(30) Foreign Application Priority Data

Dec. 24, 2004 (KR) ...................... 10-2004-0112335

(51) Int. Cl.
*H04M 1/00* (2006.01)
*H04M 3/42* (2006.01)
*H04M 3/00* (2006.01)
*H04B 1/38* (2006.01)

(52) U.S. Cl. ...................... 455/564; 455/566

(58) Field of Classification Search .............. 455/554.2, 455/566, 90.2, 90.3; 379/368, 369
See application file for complete search history.

(56) References Cited

U.S. PATENT DOCUMENTS

| | | | |
|---|---|---|---|
| 2002/0052196 A1* | 5/2002 | Padawer et al. | 455/414 |
| 2002/0067335 A1* | 6/2002 | Millington | 345/156 |
| 2005/0188312 A1* | 8/2005 | Bocking et al. | 715/739 |

* cited by examiner

*Primary Examiner*—Nick Corsaro
*Assistant Examiner*—Shannon R Brooks
(74) *Attorney, Agent, or Firm*—The Farrell Law Firm, PC

(57) ABSTRACT

Disclosed is a method and device for searching for a telephone number in a mobile terminal having a direction key that consists of a left arrow, a right arrow, an up arrow and a down arrow. The method includes displaying one or more consecutive digits input by a user in a standby mode of the mobile terminal; and when a quick search key and any arrow of the direction key are pressed simultaneously, searching for a telephone number including the displayed digits in a position corresponding to the pressed arrow.

13 Claims, 5 Drawing Sheets

FIFTH SCREEN DISPLAY (37)    # KEY & UP ARROW, OR UP ARROW OVER THE PREDETERMINED TIME PERIOD    SIXTH SCREEN DISPLAY (41)

SEVENTH SCREEN DISPLAY (43)    # KEY & DOWN ARROW, OR DOWN ARROW OVER THE PREDETERMINED TIME PERIOD    EIGHTH SCREEN DISPLAY (45)

METHOD AND DEVICE FOR TELEPHONE NUMBER SEARCH IN A MOBILE TERMINAL

PRIORITY

This application claims priority to an application entitled "Method and Device for Telephone Number Search in Mobile Terminal" filed with the Korean Intellectual Property Office on Dec. 24, 2004 and assigned Serial No. 2004-112335, the contents of which are incorporated herein by reference.

BACKGROUND OF THE INVENTION

1. Field of the Invention

The present invention relates to a mobile terminal, and more particularly to a method and device for searching for a telephone number stored in a mobile terminal.

2. Description of the Related Art

To make an outgoing call using a mobile terminal, a user has to directly input a telephone number of an intended recipient or search for the telephone number in a phonebook stored in the mobile terminal by inputting a keyword such as the recipient's name. However, the user is likely to enter a wrong digit in case where the telephone number has a length of ten or eleven digits. To search for a telephone number in the phonebook of the mobile terminal, the user has to perform the multiple steps of selecting a menu for a telephone number search, inputting a keyword such as a name of an entity whose telephone number is desired to be detected and then pressing a search key. Alternatively, the user can search every telephone number stored in the phonebook until the desired telephone number is detected. Elderly people who are not accustomed to key pressings on a mobile terminal may have difficulty in searching for a telephone number by inputting a keyword such as a name. When the user remembers only part of a desired telephone number, he or she may search a list of telephone numbers stored in the phonebook or the telephone numbers temporarily stored as a dialed number identification service to detect the desired telephone number. Although certain mobile terminals have a function enabling a user to search for a telephone number using the last four digits of the telephone number, the function is not useful when the user does not remember each of the last four digits and their proper order.

Therefore, it is necessary to provide a simple and convenient method for searching for a desired telephone number stored in a mobile terminal by inputting a part of the telephone number that the user remembers.

SUMMARY OF THE INVENTION

Accordingly, the present invention has been made to solve the above-mentioned problems occurring in the prior art, and an object of the present invention is to provide a method and device for easily searching for a telephone number stored in a mobile terminal.

Another object of the present invention is to provide a method and device for easily searching for a telephone number stored in a mobile terminal using one or more consecutive digits included in the telephone number.

In order to accomplish the above objects of the present invention, there is provided a method for searching for a telephone number stored in a mobile terminal having a direction key that consists of a left arrow, a right arrow, an up arrow and a down arrow, including displaying one or more consecutive digits inputted by a user in a standby mode of the mobile terminal; and when a quick search key and any arrow of the direction key are pressed simultaneously, searching for a telephone number including the displayed digits in a position corresponding to the pressed arrow.

In accordance with another aspect of the present invention, there is provided a device for searching for a telephone number stored in a mobile terminal, which includes a key input unit including a direction key consisting of a left arrow, a right arrow, an up arrow and a down arrow and a function key set to act as a quick search key and outputting input data corresponding to a key pressed; and a control unit for detecting whether the quick search key and any arrow of the direction key are pressed simultaneously during display of one or more digits inputted by a user in a standby mode and searching for a telephone number including the displayed digits in a position corresponding to the pressed arrow.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention unclear.

Figure 1:
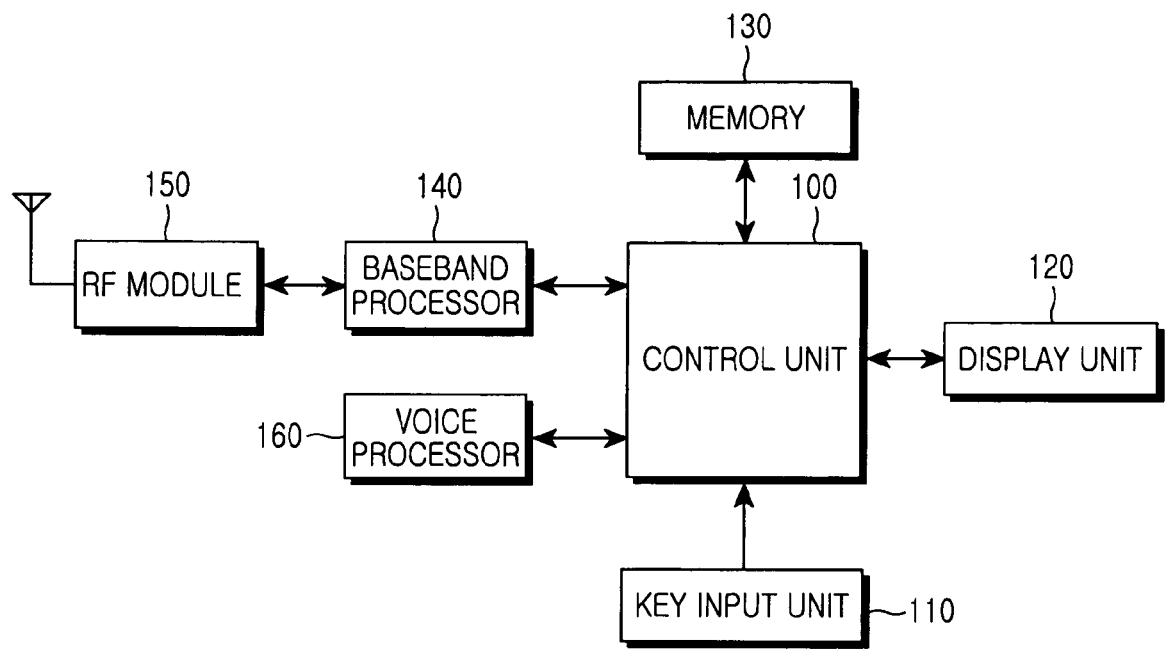
FIG. 1 is a block diagram showing the structure of a mobile terminal according to the present invention.

Referring to FIG. 1, a control unit 100 controls overall operations of the mobile terminal which are necessary to perform telephone calls, data communication and other additional functions.

A key input unit 110 is provided with keys numbered 0 through 9, a * key, a # key, a direction key and function keys (such as menu, select, send, cancel, power and volume keys) for performing various functions available in the mobile terminal. The key input unit 110 transmits input data corresponding to a key pressed by a user to the control unit 100. In accordance with the present invention, the direction key consists of an up arrow, a down arrow, a left arrow and a right arrow. It is possible to use any of the above keys as a quick search key for performing a quick search for a telephone number which has been previously stored in the mobile terminal. That key can be set to activate a quick search function only when pressed simultaneously with any arrow of the direction key. To be specific, when the user inputs one or more digits using the number keys, and then simultaneously presses the direction key and the quick search key, the control unit 100 detects the key pressings and performs a search for a telephone number including the digits inputted from the number keys. As explained above, the quick search key can be any of the plurality of keys provided on the key input unit 110. Alternatively, a separate key can be additionally provided on the key input unit 110 to be used as the quick search key. In the following description, it is assumed that the # key is set to function as the quick search key.

A display unit 120 displays various image data and information received from a base station or stored in a memory 130 under the control of the control unit 100. The memory 130 stores programs for any processing or control by the control unit 100, reference data and other various updatable data. As a working memory for the control unit 100, the memory 130 also stores a phonebook and temporarily stores recently dialed telephone numbers to implement a dialed number identification service.

An RF (radio frequency) module 150 sends and receives RF signals to and from a base station through an antenna. The RF module 150 modulates a signal received from the control unit 100 through a baseband processor 140 and transmits the modulated RF signal through the antenna. Also, the RF module 150 demodulates an RF signal received through the antenna and sends the demodulated signal to the control unit 100 through the baseband processor 140. The baseband processor 140 processes baseband signals transmitted between the RF module 150 and the control unit 100. An voice processor 160 connected to the control unit 100 and a microphone and the speaker connected to the voice processor 160 are used in telephone calls and voice recordings.

Figure 2:
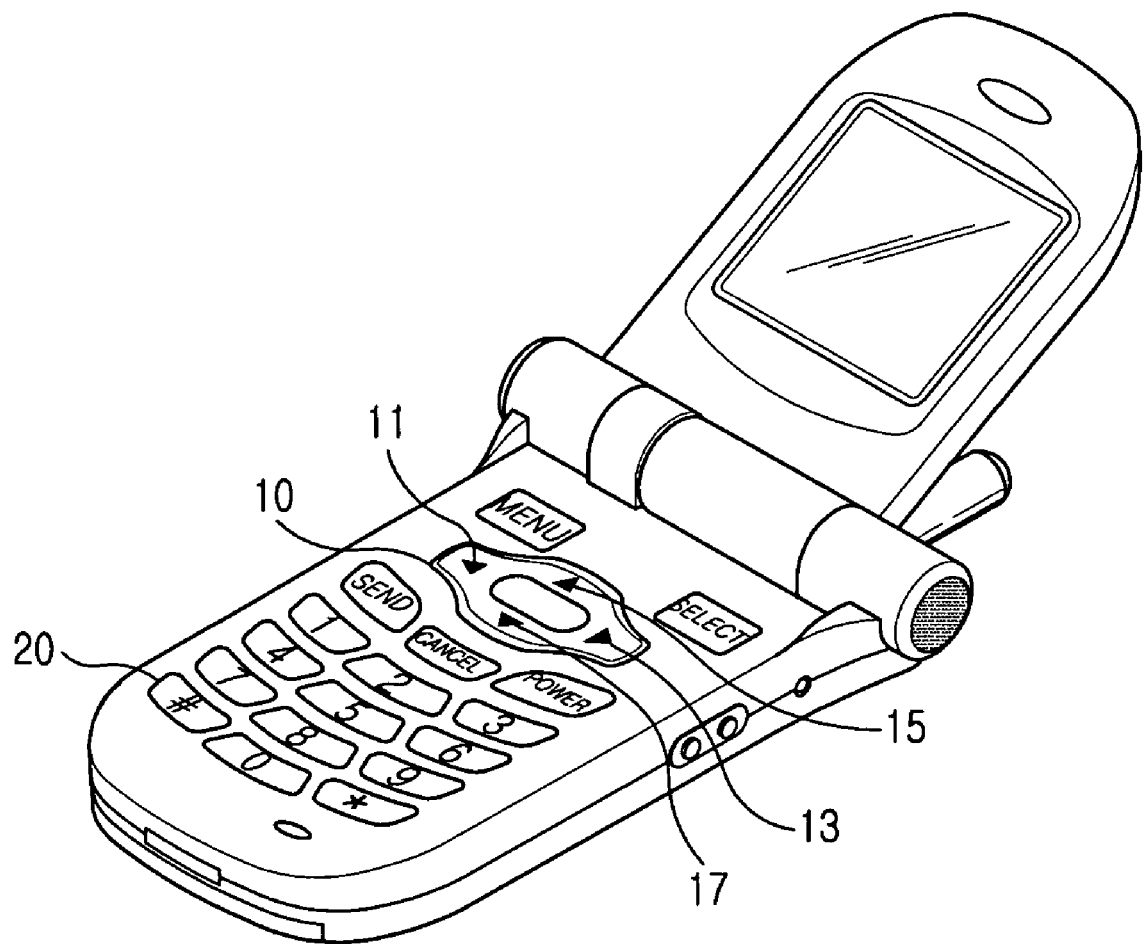
FIG. 2 is a perspective view of a mobile terminal according to the present invention.

FIG. 2 is a perspective view illustrating the exterior configuration of a mobile terminal according to the present invention. The key input unit 110 includes the number keys from 0 to 9, * key, # key 20, menu key, cancel key, send key, power key, volume key and direction key 10. The direction key 10 consists of a left arrow 11, a right arrow 13, an up arrow 15 and a down arrow 17. The # key 20 is set to function as a quick search key according to a preferred embodiment of the present invention.

In the mobile terminal having the above configuration, the control unit 100 detects any input from one or more number keys in the standby mode. Upon detecting a subsequent input by the simultaneous pressing of the # key 20 (i.e., the quick search key) and the direction key 10, the control unit 100 performs a search for a telephone number(s) including the digits previously inputted from the number keys. The control unit 100 also performs the same search when the direction key 10 is pressed for a predetermined period of time. The control unit 100 applies different search conditions according to the actually pressed arrows of the direction key 10.

For example, when the user inputs one or more digits by pressing one or more number keys in the standby mode, the control unit 100 detects the input and displays the digits corresponding to the pressed number keys on the display unit 120. Subsequently, when the user presses the left arrow 11 and the quick search key simultaneously or only the left arrow 11 for a predetermined period of time, the control unit 100 detects the key input and searches for any telephone number ending with the inputted digits. When the user presses the right arrow 13 and the quick search key simultaneously or only the right arrow 13 for the predetermined period of time, the control unit 100 searches for any telephone number beginning with the inputted digits. When the user presses the up arrow 15 or the down arrow 17 and the quick search key simultaneously or only the up or down arrow 15 or 17 for the predetermined period of time, the control unit 100 performs a search for any telephone number including the inputted digits in the middle thereof. In other words, the direction key 10 provides the control unit 100 with information about the position of the displayed digits in the telephone number to be detected. Based on the position information, the control unit 100 searches the recently dialed telephone numbers temporarily stored according to the dialed number identification service, as well as the phonebook stored in the mobile terminal, to detect the desired telephone number.

Figure 3:
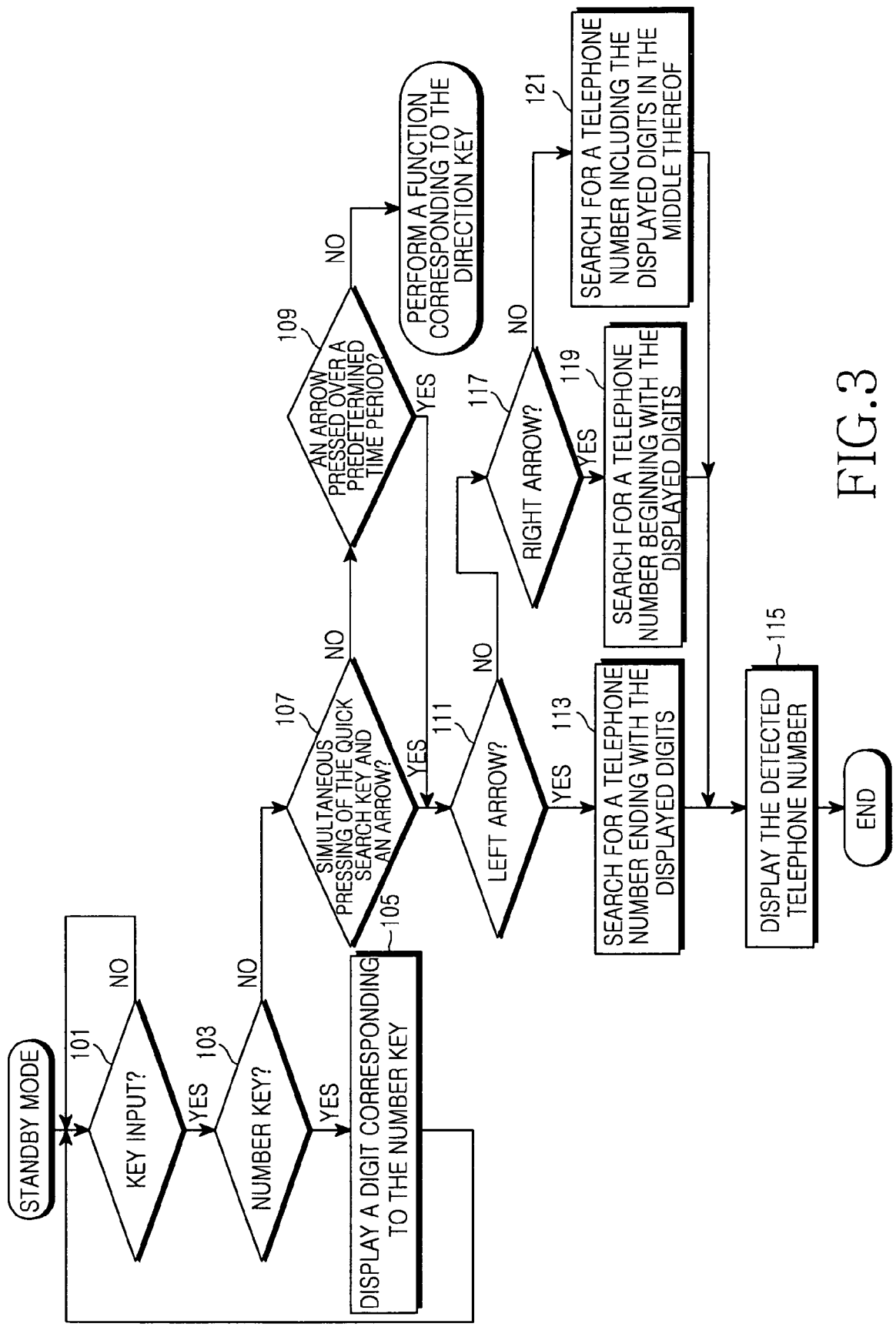
FIG. 3 is a flow chart showing a process of searching for a telephone number in a mobile terminal according to the present invention.

FIG. 3 is a flow chart showing a process of performing a telephone number search according to a preferred embodiment of the present invention. The operations of the control unit 100 will be explained in detail with reference to FIG. 3.

In the standby mode, the control unit 100 detects any key input at step 101 and determines whether the input is made from a number key at step 103. If the input is made from a number key, the control unit 100 will proceed to step 105. Otherwise, the control unit 100 will proceed to step 107. After displaying a digit corresponding to the number key on the display unit at step 105, the control unit 100 repeats steps 101 through 105 to display an additional digit inputted from the same or different number key.

At step 107, the control unit 100 determines whether the key input detected at step 101 is the simultaneous pressing of the quick search key and the direction key 10. In other words, the control unit 100 determines whether the # key and an arrow of the direction key 10 are pressed simultaneously. If the two keys are pressed simultaneously, the control unit 100 proceeds to step 111. Otherwise, the control unit will proceed to step 109 and will determine whether the key input detected at step 101 is the pressing of the direction key 10 for a predetermined period of time. If the direction key 10 is pressed for the predetermined period of time, the control unit 100 will proceed to step 111. Otherwise, the control unit 100 will perform a function corresponding to the direction key.

At step 111, the control unit 100 confirms whether the left arrow 11 of the direction key 10 has been pressed. If the left arrow 11 has been pressed, the control unit 100 will proceed to step 113. If not, the control unit 100 will proceed to step 117. At step 113, the control unit 100 searches for a telephone number ending with the displayed digits according to the input from the left arrow 11 and the # key 20. At step 115, the control unit 100 displays the detected telephone number on the display unit and terminates the telephone number search process.

At step 117, the control unit 100 determines whether the right arrow 13 of the direction key 10 has been pressed. If the right arrow 13 has been pressed, the control unit 100 will proceed to step 119. If the up arrow 15 or the down arrow 17, instead of the right arrow 13, has been pressed, the control unit 100 will proceed to step 121. At step 119, the control unit 100 searches for a telephone number beginning with the displayed digits according to the input from the right arrow 13 and the # key 20. Then the control unit 100 proceeds again to step 115 to display the detected telephone number on the display unit.

At step 121, the control unit 100 searches for a telephone number including the displayed digits in the middle thereof according to the input from the up arrow 15 or the down arrow 17 and the # key 20. Then the control unit 100 proceeds again to step 115 to display the detected telephone number on the display unit.

FIG. 4 shows example displays of a telephone number detected as a result of a telephone number search according to the present invention. When the user presses the quick search key and the left arrow 11 simultaneously or only the left arrow 11 for the predetermined period of time, a telephone number ending with the inputted digits is displayed as shown in FIG. 4A. More specifically, when the # key 20 and the left arrow 11 are pressed simultaneously during the display of three digits "455" inputted by the user in the standby mode (first screen display 31), the control unit 100 searches for any telephone number ending with the three digits "455" and displays the detected telephone number "012-111-1455" on the display unit (second screen display 33). FIG. 4B shows an example display of a telephone number detected as beginning with digits inputted by the user. When the user presses the # key 20 and the right arrow 13 simultaneously or only the right arrow 13 for the predetermined period of time during the display of four digits "0123" inputted by the user (third screen display 35), the control unit 100 searches for any telephone number beginning with the inputted digits "0123" and displays the two detected telephone numbers "012-345-6789" and "012-378-0000" (fourth screen display 37). If two or more telephone numbers are detected as shown in the fourth screen display 37, the control unit 100 will display a list of detected telephone numbers. Moreover, if the detected telephone numbers are stored in the phonebook, the control unit 100 will also display the names of people having the detected telephone numbers.

Figure 4A:
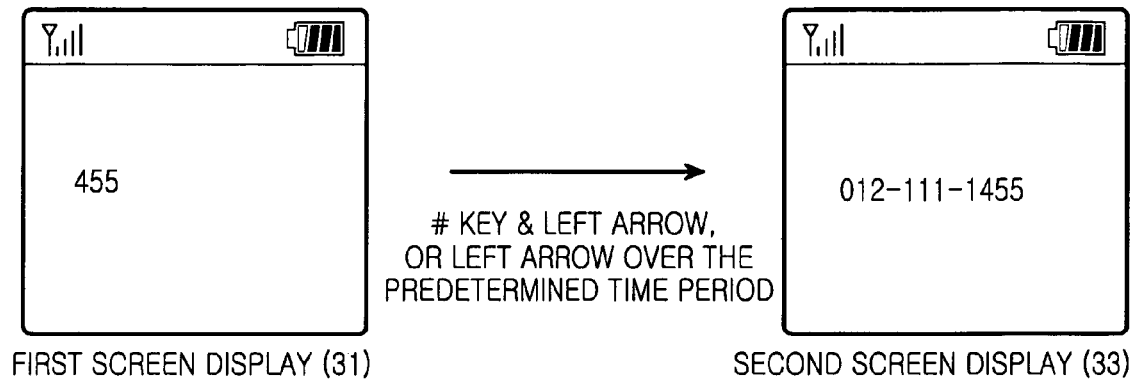
FIG. 4A shows a display of a detected telephone number when a quick search key and a left arrow are pressed simultaneously according to the present invention.
Figure 4B:
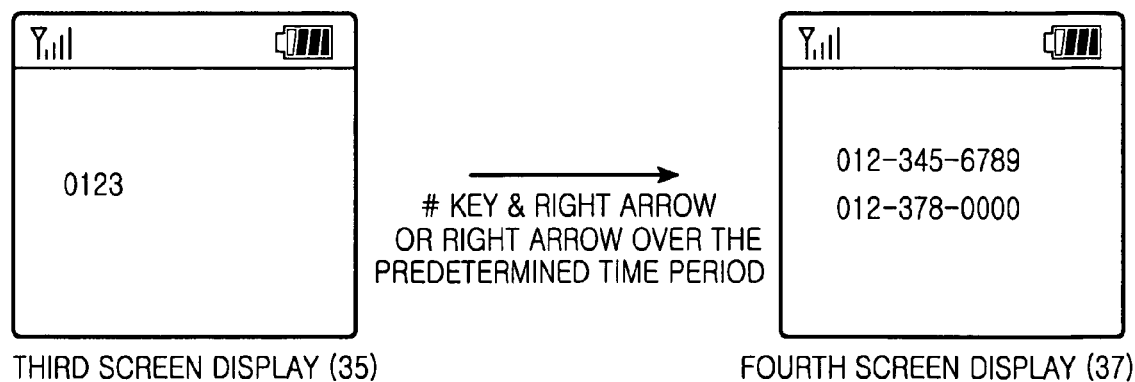
FIG. 4B is a display of a detected telephone number when a quick search key and a right arrow are pressed simultaneously according to the present invention.
Figure 4C:
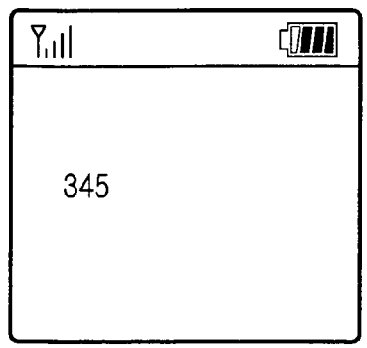
FIG. 4C is a display of a detected telephone number when a quick search key and an up arrow are pressed simultaneously according to the present invention.
Figure 4C:
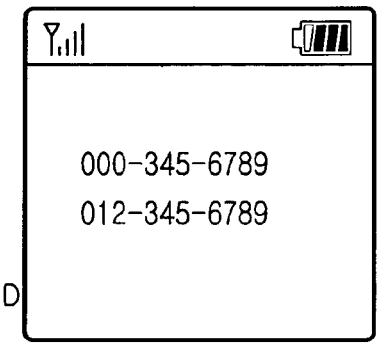
Figure 4D:
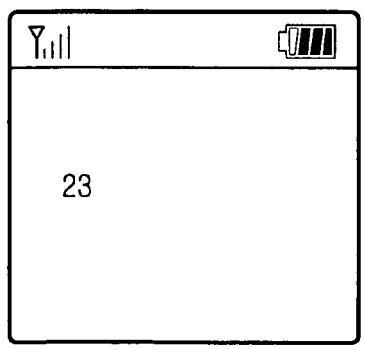
FIG. 4D is a display of a detected telephone number when a quick search key and a down arrow are pressed simultaneously according to the present invention.
Figure 4D:
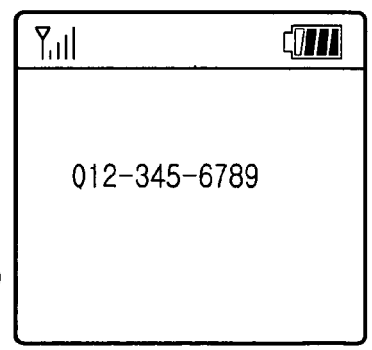

FIGS. 4C and 4D show example displays of a telephone number detected by the simultaneous pressing of the up arrow 15 or the down arrow 17 and the quick search key. When the user inputs three digits "345" using the number keys in the standby mode, the control unit 100 displays the inputted digits on the display unit (fifth screen display 39). Subsequently, when the user presses the # key 20 and the up arrow 15 simultaneously, the control unit 100 searches for any telephone number including the inputted digits "345" in the middle thereof and displays the detected telephone numbers (sixth screen display 41). Similarly, when the user simultaneously presses the # key 20 and the down arrow 17 during the display of two digits "23" inputted by the user (seventh screen display 43), the control unit 100 searches for any telephone number including the two digits in the middle thereof and displays the detected telephone number (eighth screen display 45). Also, when only the up arrow 15 or the down arrow 17 is pressed for the predetermined period of time, the control unit 100 performs the same search and detects a telephone number(s) including the inputted digits "345" or "23" in the middle thereof, respectively.

The user can easily search for a desired telephone number using only a part of the telephone number that the user remembers.

As explained above, when the user inputs one or more consecutive digits included in a desired telephone number and presses the quick search key and an arrow simultaneously or only the arrow for the predetermined period of time, the mobile terminal performs a quick search for a telephone number(s) including the inputted digits in a position corresponding to the pressed arrow, which improves user convenience.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for searching for a telephone number stored in a mobile terminal having a direction key, comprising the steps of:
    displaying one or more consecutive digits input by a user in a standby mode of the mobile terminal; and
    when a quick search key and the direction key are pressed simultaneously, searching for a telephone number including the displayed digits in a position corresponding to a direction of the direction key.

2. The method as claimed in claim 1, wherein the direction key consists of a left arrow, a right arrow, an up arrow, and a down arrow.

3. The method as claimed in claim 2, wherein said step of searching for a telephone number includes:
    when the quick search key and the left arrow are pressed simultaneously, searching for a telephone number ending with the displayed digits.

4. The method as claimed in claim 2, wherein said step of searching for a telephone number includes:
    when the quick search key and the right arrow are pressed simultaneously, searching for a telephone number beginning with the displayed digits.

5. The method as claimed in claim 2, wherein said step of searching for a telephone number includes:
    when the quick search key and one of the up arrow and the down arrow are pressed simultaneously, searching for a telephone number including the displayed digits in the middle thereof.

6. The method as claimed in claim 1, wherein said quick search key is selected and set from a plurality of function keys provided on the mobile terminal.

7. A method for searching for a telephone number in a mobile terminal having a direction key that consists of a left arrow, a right arrow, an up arrow and a down arrow, comprising the steps of:
    displaying one or more consecutive digits input by a user in a standby mode of the mobile terminal;
    determining whether a quick search key and any arrow of the direction key are pressed simultaneously;
    when the pressed arrow is the left arrow, searching for a telephone number ending with the displayed digits;
    when the pressed arrow is the right arrow, searching for a telephone number beginning with the displayed digits; and
    when the pressed arrow is one of the up arrow and the down arrow, searching for a telephone number including the displayed digits in the middle thereof.

8. A method for searching for a telephone number stored in a mobile terminal having a direction key, comprising the steps of:
    displaying one or more consecutive digits input by a user in a standby mode of the mobile terminal; and
    when the direction key is pressed for a predetermined period of time, searching for a telephone number including the displayed digits in a position corresponding to a direction of the direction key.

9. The method as darned in claim 8, wherein the direction key consists of a left arrow, a right arrow, an up arrow, and a down arrow.

10. A method for searching for a telephone number in a mobile terminal having a direction key that consists of a left arrow, a right arrow, an up arrow and a down arrow, comprising the steps of:
    displaying one or more consecutive digits input by a user in a standby mode of the mobile terminal;

determining whether any arrow of the direction key is pressed for a predetermined period of time;

when the pressed arrow is the left arrow, searching for a telephone number ending with the displayed digits;

when the pressed arrow is the right arrow, searching for a telephone number beginning with the displayed digits; and when the pressed arrow is one of the up arrow and the down arrow, searching for a telephone number including the displayed digits in the middle thereof.

11. A device for searching for a telephone number stored in a mobile terminal, comprising:

a key input unit including a direction key consisting of a left arrow, a right arrow, an up arrow and a down arrow and a function key set to act as a quick search key and outputting input data corresponding to a key pressed; and a control unit for detecting whether the quick search key and any arrow are pressed simultaneously during display of one or more digits input by a user in a standby mode and searching for a telephone number including the input digits in a position corresponding to the pressed arrow.

12. A device for searching for a telephone number stored in a mobile terminal, comprising:

a key input unit including a direction key and a function key set to act as a quick search key and outputting data corresponding to a key pressed; and a control unit for detecting whether the quick search key and the direction key are simultaneously pressed, or if the direction key is pressed for a predetermined period of time, during display of one or more digits input by a user in a standby mode and searching for a telephone number including the input digits in a position corresponding to a direction of the direction key.

13. A device according to claim 12, wherein the direction key consists of a left arrow, a right arrow, an up arrow, and a down arrow.

* * * * *